Patented June 17, 1930

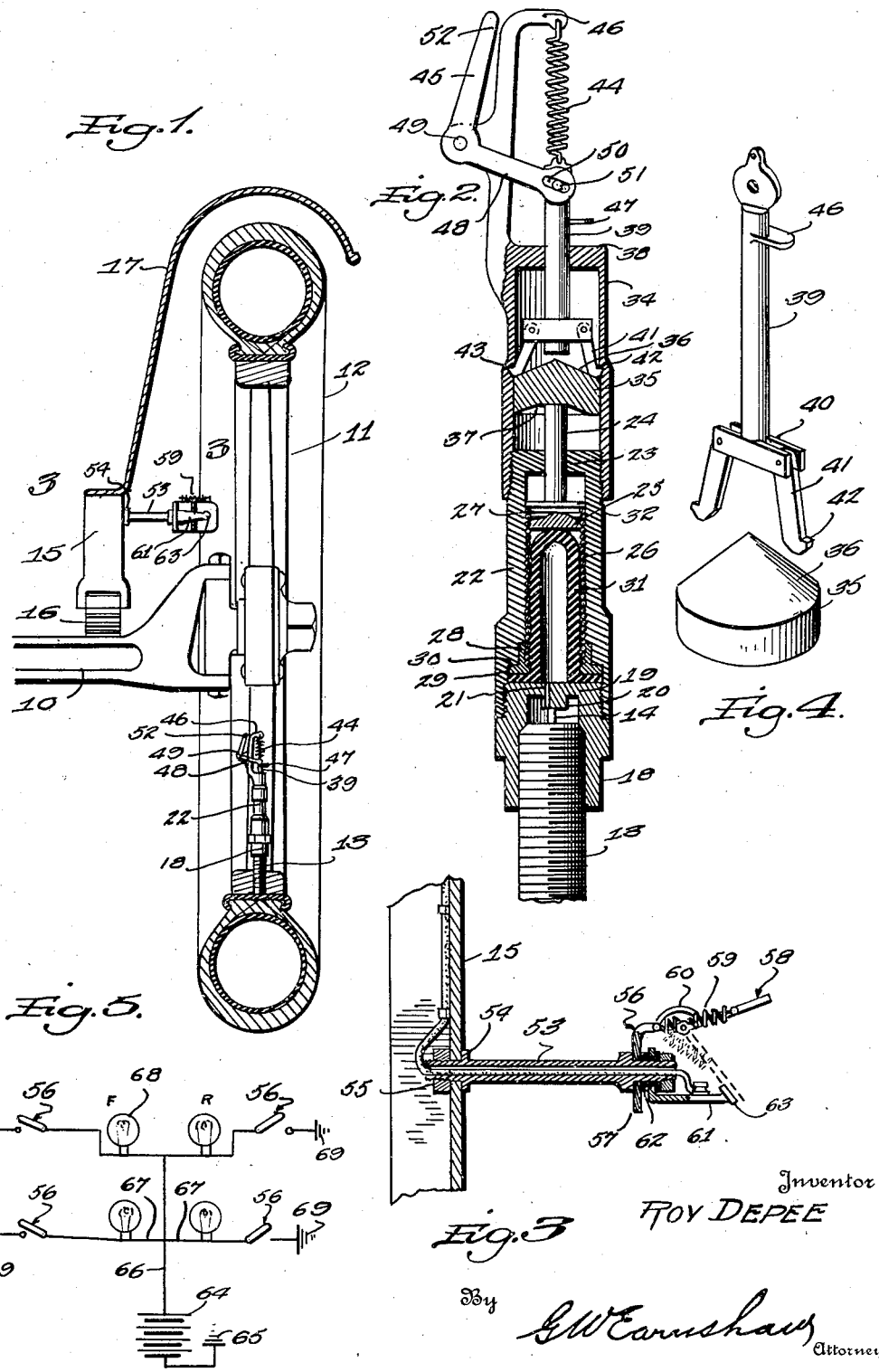

1,765,213

UNITED STATES PATENT OFFICE

ROY DEPEE, OF CENTURY, OKLAHOMA

TIRE-DEFLATION INDICATOR

Application filed February 8, 1927. Serial No. 166,794.

This invention relates to tire deflation indicators adapted for use in connection with the pneumatic tires of motor vehicles.

An important object of the invention is to provide a simple device which is adapted to give an indication to the driver of the vehicle when either of the tires thereof becomes deflated below a predetermined pressure.

A further object is to provide a device adapted to be threaded on the upper end of a tire valve stem to replace the usual valve cap and adapted to actuate a suitable switch when the tire becomes deflated to give the operator of the vehicle an indicating signal.

A further object is to provide a device of the character just mentioned wherein locking means for the switch actuating device is provided and adapted to be maintained in locked position when the tire is properly inflated, and adapted to be unlocked upon deflation of the tire below a predetermined pressure whereby the switch will be actuated to provide a signal.

A further object is to provide an expansible member adapted to hold the switch actuating device in unlocked position when the tire is properly inflated, and to provide resilient means adapted to contract the expansible device upon a predetermined drop in pressure in the tire.

A further object is to provide a switch device carried by a stationary part of the vehicle such as the frame, and an actuating device for the switch carried by a wheel of the vehicle and normally arranged in such a position that the switch is out of the path of travel thereof, the switch actuating member having a portion movable laterally with respect to the wheel to operate the switch and provide a signal when the tire becomes deflated below a predetermined pressure.

Other objects and advantages of the invention will become apparent during the course of the following description.

In the drawings I have shown one embodiment of the invention. In this showing,

Figure 1 is a sectional view through a vehicle wheel and associated elements showing the device in position, parts being shown in elevation, Figure 2 is a central sectional view through the device, Figure 3 is a section on line 3—3 of Figure 1, Figure 4 is a detail perspective of the locking device for the switch actuating means, and associated elements, and, Figure 5 is a diagrammatic view showing the electrical connections of the device.

Referring to the drawings the numeral 10 designates an axle of a vehicle upon which is mounted a wheel 11 having a pneumatic tire 12 mounted thereon and provided with the usual valve stem 13. The valve stem is provided with the usual valve having an upward projection 14 which is adapted to be depressed to open the valve in the usual manner. A frame 15 is suspended above the axles of the vehicle by the usual springs 16, and a mud guard 17 covers the wheel 11 as shown in Figure 1.

The device forming the subject matter of the present application includes a thimble 18 which is threaded on the upper end of the valve stem 13, replacing the valve cap usually employed. The thimble is provided with a head 19 having a downwardly projecting lug 20 which engages the projection 14 to hold the tire valve in open position when the device is applied in the manner shown. The head 19 is further provided with a small passage 21 through which air is adapted to pass when the valve is held in open position in the manner indicated.

A sleeve 22 is internally threaded at its lower end to receive the external threads of the upper end of the thimble 18. The upper end of the sleeve 22 is provided with an axial opening 23 in which a stem 24 is slidably mounted. A head 25 is mounted to reciprocate within the sleeve 22 and is connected to or formed integral with the stem 24. The sleeve 22 is provided with a coil spring 26 arranged therein, and the upper coils of this spring engage a thread groove 27 formed in the surface of the head 25 whereby this element will be secured to the spring. In a similar manner, the lower turns of the spring are threaded into a relatively small thimble 28 having an annular flange 29 at its lower end arranged beneath an internal shoulder formed in the sleeve 22. An expansible member 31 is arranged within the spring 26 and is closed at its upper end as indicated at 32. The lower end of the expansible member is provided with an annular flange 33 which seats against the upper face of the head 19. It will be apparent that when the sleeve 22 is secured in position, the shoulder 30 serves to securely clamp the flanges 29 and 33 against the thimble 18, thus preventing the leakage of air from the interior of the member 31. The expansible member 31 is preferably formed of rubber, and it will be apparent that the introduction of air thereinto is adapted to cause this member to become extended vertically, the spring 26 acting as confining means to prevent transverse expansion. Since the projection 14 is depressed when the device is in operation, it will be apparent that air under pressure will be supplied to the interior of the expansible member 31.

A cap 34 is threaded on the upper end of the sleeve 22 as clearly shown in Figure 2. The cap 34 is provided with a cylindrical bore in which a lock actuating member 35 is mounted to reciprocate. The upper face of the member 35 is substantially conical, as indicated at 36, while this member is provided in its lower face with a recess or depression 37 in which the stem 24 projects. The cap 34 is provided with a head 38 having an axial opening therein through which a stem 39 projects. This stem is provided at its lower end, within the cap 34, with a cross head 40 to opposite ends of which locking members 41 are pivoted. Each locking member is provided with an outwardly projecting finger adapted to engage in an annular groove 43 formed within the cap 34 for a purpose to be described.

A spring 44 is provided for normally moving the stem 39 inwardly radially with respect to the vehicle wheel, one end of the spring being connected to the stem 39. A bracket 45 is preferably formed integral with the cap 34 and is provided with an overhanging end 46 to which the other end of the spring 44 is attached. The stem 39 is provided with a finger piece 47 by means of which the stem 39 may be set in normal running position. A bell crank lever 48 is pivotally connected to the bracket 45 as indicated at 49. One end of the bell crank lever is provided with a slot 50 to receive a pin 51 carried by the upper end of the stem 39. The other end 52 of the bell crank lever is adapted to be swung outwardly upon upward movement of the stem 39 to operate a switch to be described.

Referring to Figures 1 and 3, the numeral 53 designates a supporting bracket carried by the frame or other relatively stationary portion of the vehicle. The bracket 52 is preferably tubular and is provided with a flange 54 adapted to engage the outer face of the vehicle frame, and a nut 55 is adapted to secure the clamp in position, as shown in Figure 3. A switch indicated as a whole by the numeral 56 is arranged on the outer end of the bracket 53. This switch includes a stationary member 57 having a swinging arm 58 pivotally connected at one end thereto. A coil spring 59 is connected at one end to the stationary member 57 and at its opposite end to the switch arm 54, and normally holds the latter in the solid line position shown in Figure 3. A stop 60 carried by the member 57 prevents turning movement of the arm 58 beyond normal position. A stationary switch arm 61 is carried by the outer end of the bracket and is insulated therefrom as indicated at 62. The stationary switch arm is provided at its outer end with a contact 63 adapted to be engaged by the switch arm 58 when the latter is swung to the dotted line position, in a manner to be described.

While I have described one of the devices adapted for connection to a vehicle tire, it will be apparent that each tire of the vehicle is provided with such a device, and means are arranged adjacent the driver's seat to give suitable indication to the driver of the vehicle when one of the tires becomes deflated. Such indicating means is adapted to be controlled by the device previously described through the medium of electric circuits illustrated in Figure 5. Referring to this figure, the numeral 64 designates a source of current having one terminal grounded to the frame of the vehicle as indicated at 65. The opposite terminal of the battery is provided with a lead wire 66, and this wire is connected by branch wires 67 with a plurality of lights or other signals 68. These signals preferably are arranged on the dash of the vehicle in such a manner as to correspond as to the number and arrangement of the vehicle tires, and the opposite terminal of each signal is connected to one of the switches 56. From each switch 56 the current passes to a ground 69, when the switch is closed, and hence returns to the source of current through the ground 65.

The operation of the device is as follows:
A tire is inflated in the usual manner, whereupon the device is placed in position by threading the thimble 18 on the valve stem. This action causes the tire valve to be opened, thus permitting the escape of air under pressure into the expansible member 31. The spring 36 obviously confines the expansible member, and accordingly the latter becomes extended longitudinally and its closed end moves the stem 24 inwardly radially with respect to the wheel. The spring 26 is of the retractile type, and thus opposes the expansive movement of the member 31. The degree of pressure necessary to operate the device obviously depends upon the tension of the spring 26, and springs of various tensions are employed depending upon the type of tire in connection with which the device is employed, and the rated pressure capacity of such tire. After the device is in position, the member 35 will support the arms 41 with the fingers thereof above the annular groove 43. The stem 39 is then depressed by pushing upon the finger piece 46, and as soon as the fingers 42 coincide in position with the groove 43, the conical head 36 moves the arms 41 outwardly whereby the fingers 42 engage within the groove 43. The upward pressure exerted on the member 35 causes the arms 41 to retain the position just referred to, thus preventing upward movement of the stem 39. The bell crank lever will then be arranged in the position shown in Figures 1 and 2, and the vehicle is driven in the usual manner. With the parts in the position shown, the movable switch arm 58 is arranged out of the path of travel of the end 52 of the bell crank lever 48, and accordingly the switch arm is in the solid line position shown in Figure 3. If the tire becomes deflated beyond a predetermined pressure, the spring 26 acts to overcome the expansive action of the air upon the member 31, thus retracting the head 25 and stem 24. The member 35 thereby releases the arms 41, and the spring 44 moves the stem 39 inwardly radially with respect to the vehicle wheel. This action obviously swings the bell crank lever about its pivot 49, and moves the end 52 of the bell crank lever inwardly. Under such conditions, the movable switch arm 58 will be arranged in the path of travel of the end of the bell crank lever, and upon continued rotation of the wheel, the switch arm 58 will be swung to the dotted line position shown in Figure 3. It will be apparent that the spring 59 passes the center of the pivot of the arm 58 as the latter is swung to either extreme position, and the spring 59 therefore serves to hold the switch arm in either position. When the switch arm is swung to the dotted line position shown in Figure 3, it will close a circuit to the corresponding signal 65 whereby the operator of the vehicle will be provided with a signal indicating that the corresponding tire has become deflated. The switch arm 58 is reset before proceeding to drive the vehicle, and after the deflated tire has been inflated or repaired.

It is to be understood that the form of the invention herewith shown and described is to be taken as a preferred example of the same and that various changes in the shape, size and arrangement of parts may be resorted to without departing from the spirit of the invention or the scope of the subjoined claim.

I claim:

A device of the character described comprising a thimble threaded at its lower end for connection with the valve stem of a pneumatic tire and provided with a head adapted to hold the valve thereof in open position, a sleeve arranged in axial alinement with said thimble and threaded thereto, said head being provided with an opening, a longitudinally expansible member arranged in said sleeve and having a flange at its lower end clamped between said thimble and said sleeve, a stem slidable in the upper end of said sleeve and projecting upwardly therebeyond, a head arranged on the lower end of said stem and contacting with the upper end of said expansible member, a cap arranged on the upper end of said sleeve, a slidable member arranged in said cap and contacting with the upper end of said stem, signal actuating means including a stem slidable in the upper end of said cap, said slidable member being adapted to lock said last named stem against movement when the pressure in said expansible member is above a predetermined point, said slidable member being movable downwardly upon a decrease in pressure below such predetermined point to release said last named stem, said cap being provided with an internal annular groove, arms carried by said last named stem and having fingers at the lower end thereof engageable in said groove, the upper face of said slidable member being conical and adapted to engage said arms to urge the fingers thereof outwardly into engagement with said groove, and resilient means normally urging said last named stem upwardly.

In testimony whereof I affix my signature.

ROY DEPEE.